(12) United States Patent
Rowe et al.

(10) Patent No.: US 9,304,512 B2
(45) Date of Patent: Apr. 5, 2016

(54) PROPULSION PROGNOSTICS APPARATUS AND SYSTEMS FOR UNMANNED AERIAL VEHICLES

(75) Inventors: Eric Rowe, Albuquerque, NM (US); James Nickerson, Albuquerque, NM (US); David E. Ekhaguere, Albuquerque, NM (US); Richard E. Annati, Albuquerque, NM (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 2340 days.

(21) Appl. No.: 12/268,696

(22) Filed: Nov. 11, 2008

(65) Prior Publication Data

US 2010/0286860 A1     Nov. 11, 2010

(51) Int. Cl.
  *G05B 23/02*   (2006.01)
  *G01M 15/05*   (2006.01)
  *G06N 5/00*    (2006.01)
  *G07C 5/08*    (2006.01)

(52) U.S. Cl.
  CPC .......... *G05B 23/0283* (2013.01); *G01M 15/05* (2013.01); *G05B 23/02* (2013.01); *G05B 23/0205* (2013.01); *G05B 23/0259* (2013.01); *G06N 5/00* (2013.01); *B64C 2201/141* (2013.01); *F05D 2260/80* (2013.01); *G07C 5/0808* (2013.01)

(58) Field of Classification Search
  CPC .............. B64F 5/0045; G05B 23/0283; G05B 23/0275; G05B 23/0205; G05B 23/0259; G05B 23/02; F05D 2260/80; G07C 5/0808; B64C 2201/141; G01M 15/05; G06N 5/00

USPC .......... 701/3, 4, 8, 9, 11, 14, 5, 29, 31, 33–35
See application file for complete search history.

(56) References Cited

U.S. PATENT DOCUMENTS

| | | | |
|---|---|---|---|
| 5,408,412 A * | 4/1995 | Hogg et al. .................... 701/33 |
| 5,938,401 A * | 8/1999 | Modeen et al. ................ 415/36 |
| 6,216,066 B1 | 4/2001 | Goebel et al. | |
| 6,389,335 B1 * | 5/2002 | Vos .................................. 701/4 |
| 6,526,356 B1 * | 2/2003 | DiMaggio et al. ............. 702/35 |
| 6,556,902 B2 | 4/2003 | Ing et al. | |
| 6,567,729 B2 | 5/2003 | Betters et al. | |
| 6,622,972 B2 * | 9/2003 | Urnes et al. ................... 244/194 |

(Continued)

OTHER PUBLICATIONS

EP Search Report, EP 09 169 099.0 dated Jan. 12, 2012.

(Continued)

*Primary Examiner* — Jason Holloway
(74) *Attorney, Agent, or Firm* — Ingrassia Fisher & Lorenz, P.C.

(57) ABSTRACT

Propulsion prognostics apparatus and systems for an unmanned aerial vehicle (UAV) are provided. One propulsion prognostics apparatus comprises a prognostics module configured to generate prognostics data and a power output sensor configured to be coupled to the engine system and configured to generate power output data representing an actual power output of the engine system. The propulsion prognostics apparatus further comprises a processor coupled to the prognostics module and the power output sensor. The processor is configured to receive the prognostics data and the power output data, compare the prognostics data and the power output data, and determine the airworthiness of the UAV based on the comparison. A propulsion prognostics system includes a UAV having an engine system and the above propulsion prognostics apparatus coupled to the UAV.

20 Claims, 7 Drawing Sheets

(56) References Cited

U.S. PATENT DOCUMENTS

| | | | |
|---|---|---|---|
| 6,664,945 B1* | 12/2003 | Gyde et al. | 345/156 |
| 6,684,349 B2 | 1/2004 | Gullo et al. | |
| 6,751,536 B1* | 6/2004 | Kipersztok et al. | 701/31.6 |
| 6,843,060 B2 | 1/2005 | Gallant et al. | |
| 6,907,416 B2* | 6/2005 | Tasooji et al. | 706/50 |
| 7,031,812 B1 | 4/2006 | Pettigrew et al. | |
| 7,308,614 B2 | 12/2007 | Kojori | |
| 7,343,232 B2 | 3/2008 | Duggan et al. | |
| 7,449,858 B2* | 11/2008 | Chang et al. | 318/636 |
| 7,656,637 B2* | 2/2010 | McAvoy et al. | 361/115 |
| 2002/0010532 A1 | 1/2002 | Sinex | |
| 2003/0195718 A1 | 10/2003 | Crowder, Jr. | |
| 2004/0088991 A1* | 5/2004 | Gallant et al. | 60/772 |
| 2004/0139735 A1 | 7/2004 | Zhu | |
| 2004/0254747 A1 | 12/2004 | Vollum | |
| 2005/0018369 A1* | 1/2005 | Bax et al. | 361/42 |
| 2005/0096873 A1 | 5/2005 | Klein | |
| 2005/0114090 A1 | 5/2005 | Black et al. | |
| 2005/0209767 A1 | 9/2005 | Kim et al. | |
| 2005/0212523 A1* | 9/2005 | Chang et al. | 324/511 |
| 2006/0047403 A1 | 3/2006 | Volponi et al. | |
| 2006/0259217 A1 | 11/2006 | Gorinevsky et al. | |
| 2007/0113670 A1 | 5/2007 | Etchason | |
| 2007/0142980 A1* | 6/2007 | Ausman et al. | 701/3 |
| 2008/0004768 A1* | 1/2008 | Chang et al. | 701/36 |
| 2008/0039993 A1 | 2/2008 | Cleary et al. | |
| 2008/0177515 A1 | 7/2008 | Saintis | |
| 2009/0152391 A1* | 6/2009 | McWhirk | 244/30 |
| 2009/0259350 A1* | 10/2009 | Morris et al. | 701/3 |
| 2010/0168952 A1* | 7/2010 | Falkmann et al. | 701/29 |

OTHER PUBLICATIONS

Motter, M. A. et al., "A Turbine-powered UAV Controls Testbed", AIAA Paper 2007-2751, AIAA Infotech@Aerospace 2007 Conference and Exhibit, Rohnert Park, California, May 2007, May 7, 2007, pp. 1-8, URL: http://ntrs.nasa.gov/archive/nasa/casi.ntrs.nasa.gov/20070021748_2007020307.pdf.

Filippone et al: "Comprehensive analysis of transport aircraft flight performance", Progress in Aerospace Sciences, Oxford, GB, vol. 44, No. 3, Dec. 31, 2007, pp. 192-236.

Wigley G. et al: "A Low Cost, High Performance Reconfigurable Computing Based Unmanned Aerial Vehicle", 2006 IEEE Aerospace Conference, Big Sky, Montana, Mar. 4-11, 2006, Jet Propulsion Laboratory, National Aeronautics and Space Administration, Pasadena, CA, USA, Mar. 4, 2006, pp. 1-13.

Sheppard, J. W.; IEEE Standards for Prognostics and Health Management, Aerospace and Electronic Systems Magazine, IEEE, Sep. 2009.

EP Communication, EP 09169099.0-1225 dated Nov. 7, 2012.
EP examination report, EP 09169099.0-1951 dated Jan. 20, 2014.
EP Communication, EP 09 169 099.0 dated Jan. 8, 2013.
EP Communication, for application No. EP 09 169 099.0 dated Jun. 10, 2013.

* cited by examiner

PROPULSION PROGNOSTICS APPARATUS AND SYSTEMS FOR UNMANNED AERIAL VEHICLES

STATEMENT REGARDING FEDERALLY SPONSORED RESEARCH OR DEVELOPMENT

The United States Government has a paid-up license in this invention and the right in limited circumstances to require the patent owner to license others on reasonable terms as provided by the terms of Contract No. W56HZV-05-C-0724 awarded by the United States Army.

FIELD OF THE INVENTION

The present invention generally relates to small-scale unmanned aerial vehicles, and more particularly relates to propulsion prognostics apparatus and systems for unmanned aerial vehicles.

BACKGROUND OF THE INVENTION

Ducted fan propulsion systems for unmanned aerial vehicles are propulsion systems that include a fan surrounded by a duct. The fan is driven by a motor or engine and the configuration of the duct increases the efficiency/power of the fan. A ducted fan vertical take-off and landing (VTOL) UAV is an aircraft that uses a ducted fan propulsion system to provide vertical take-off and landing capabilities to the UAV. Control of a ducted fan VTOL UAV can be provided via modulation, or vectoring, of the thrust provided by the ducted fan propulsion system through the use of flight control vanes that are mounted in the exit air stream of the ducted fan propulsion system.

Ducted fan propulsion systems for contemporary small-scale (e.g., VTOL) UAVs do not have established problem detection apparatus or systems. As such, it is left up to the instincts and/or experience of users to determine if unmanned aerial vehicles are airworthy for both pre-flight operations and in-flight operations. In other words, it is left up to a user to determine if the engine is producing enough power for an unmanned aerial vehicle to begin flying and/or to continue flying.

Accordingly, it is desirable to provide propulsion prognostics apparatus and systems for unmanned aerial vehicles. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Various embodiments provide propulsion prognostics apparatus for an unmanned aerial vehicle (UAV) having an engine system. One propulsion prognostics apparatus comprises a prognostics module configured to generate prognostics data and a power output sensor configured to be coupled to the engine system and configured to generate power output data representing an actual power output of the engine system. The propulsion prognostics apparatus further comprises a processor coupled to the prognostics module and the power output sensor. The processor is configured to receive the prognostics data and the power output data, compare the prognostics data and the power output data, and determine the airworthiness of the UAV based on the comparison.

Various other embodiments provide systems comprising a UAV including an engine system and a propulsion prognostics apparatus coupled to the UAV. The propulsion prognostics apparatus comprises a prognostics module configured to generate prognostics data, a power output sensor coupled to the engine system and configured to generate power output data representing an actual power output of the engine system, and a processor coupled to the prognostics module and the power output sensor. The processor is configured to receive the prognostics data and the power output data, compare the prognostics data and the power output data, and determine the airworthiness of the UAV based on the comparison.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various embodiments of the invention provide propulsion prognostics apparatus for an unmanned aerial vehicle (UAV). Also provided are UAVs comprising the propulsion prognostics apparatus.

Figure 1:
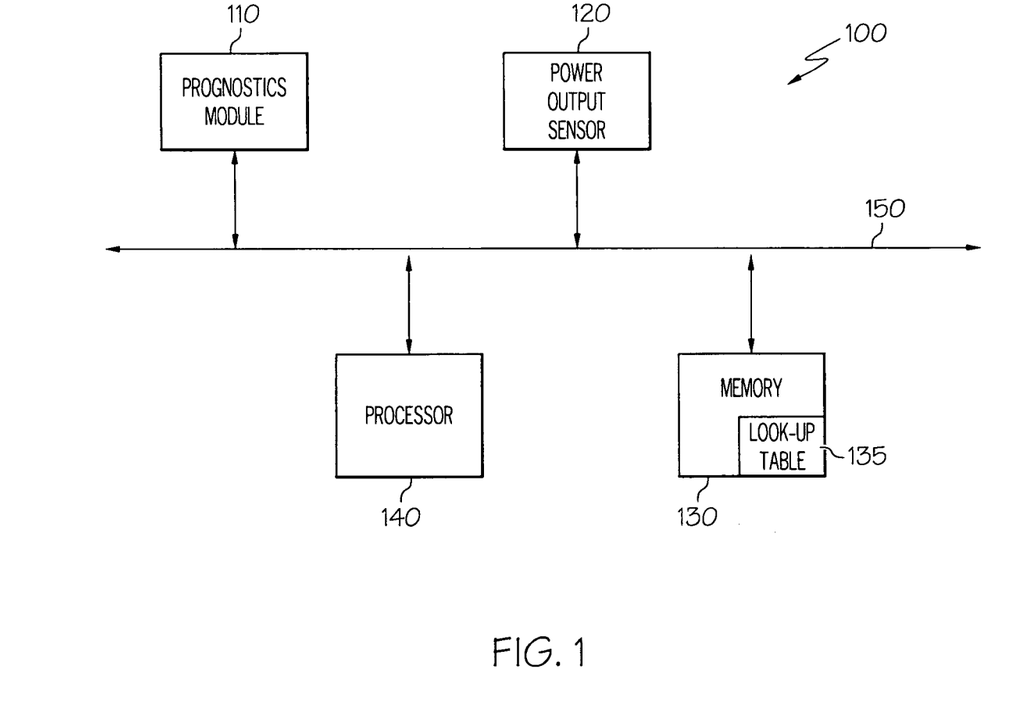
FIG. 1 is a block diagram of one embodiment of a propulsion prognostics apparatus.

Turning now to the figures, FIG. 1 is a block diagram of one embodiment of a propulsion prognostics apparatus 100 for a UAV. At least in the illustrated embodiment, propulsion prognostics apparatus 100 comprises a prognostics module 110, a power output sensor 120, memory 130, and a processor 140 coupled to one another via a bus 150 (e.g., a wired and/or wireless bus).

Figure 2:
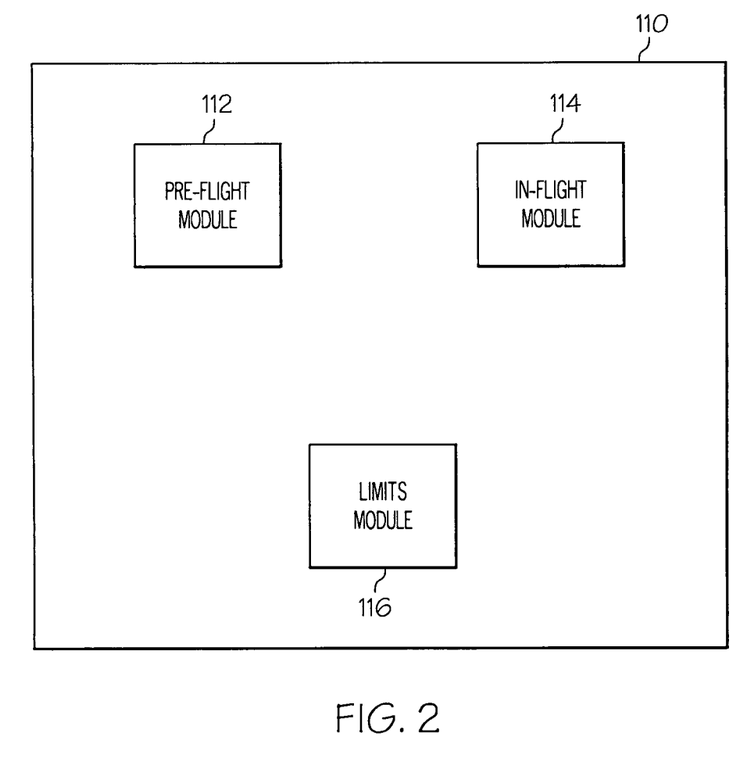
FIG. 2 is a block diagram of an embodiment of a prognostics module included in the propulsion prognostics apparatus of FIG. 1.

Prognostics module 110 is configured to monitor the pre-flight and/or in-flight health of a UAV. In one embodiment (see FIG. 2), prognostics module 110 comprises a pre-flight module 112, an in-flight module 114, and a limits module 116. Various other embodiments of prognostics module 110 comprise pre-flight module 112, in-flight module 114, or limits module 116. In still other embodiments, prognostics module 110 comprises pre-flight module 112 and in-flight module 114, pre-flight module 112 and limits module 116, or in-flight module 114 and limits module 116.

Figure 3:
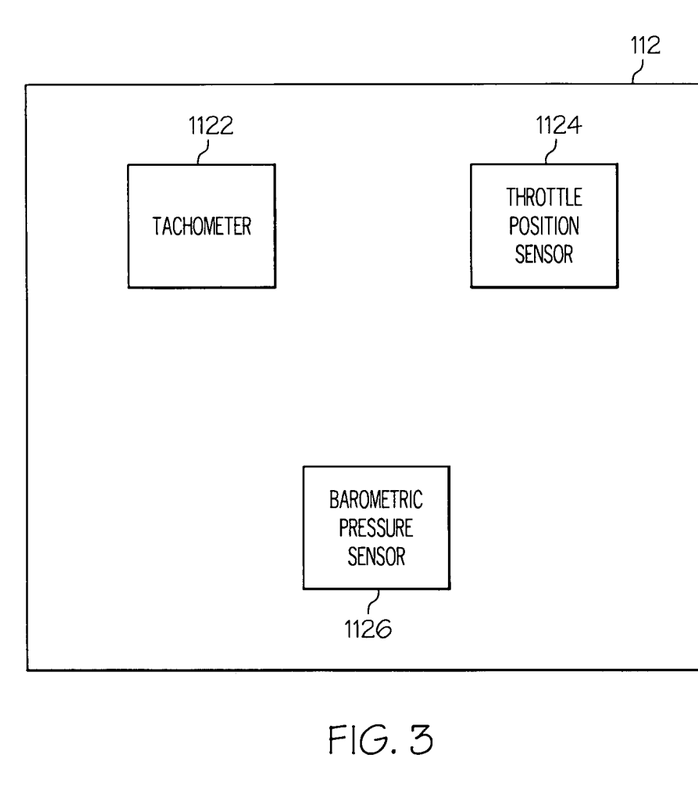
FIG. 3 is a block diagram of one embodiment of a pre-flight module included in the prognostics module of FIG. 2.

In the embodiment illustrated in FIG. 3, pre-flight module 112 comprises a tachometer 1122, a throttle position sensor 1124, and a barometric pressure sensor 1126. Tachometer 1122 is configured to be coupled to the engine of a UAV and is configured to sense the rotational speed (i.e., revolutions-per-minute (RPM)) of the engine prior to flight. Throttle position sensor 1124 is configured to be coupled to the throttle of the UAV and is further configured to sense the position of the throttle or, in other words, how much throttle the user is applying to the engine prior to flight. Barometric pressure sensor 1126 may be any system and/or device capable of sensing the barometric pressure in the environment surrounding pre-flight module 112 and/or the UAV.

Figure 4:
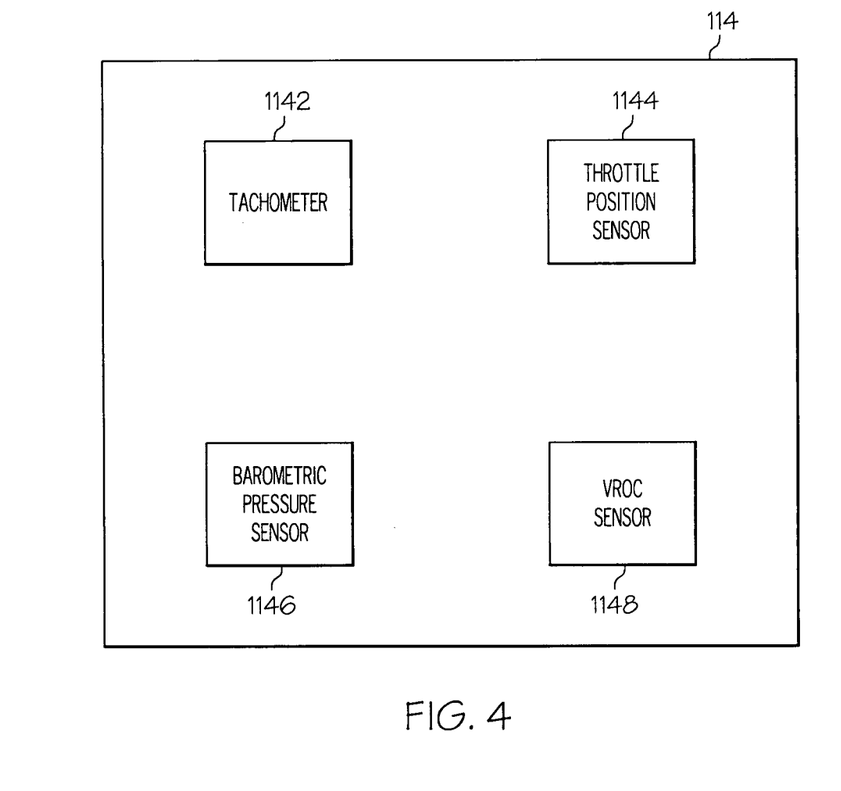
FIG. 4 is a block diagram of an embodiment of an in-flight module included in the prognostics module of FIG. 2.

In-flight module 114, at least in the embodiment illustrated in FIG. 4, comprises a tachometer 1142, a throttle position sensor 1144, a barometric pressure sensor 1146, and a vertical rate of climb (VROC) sensor 1148. Tachometer 1142 is configured to be coupled to the engine of a UAV and is configured to sense the rotational speed (i.e., revolutions-per-minute (RPMs)) of the engine during flight. Throttle position sensor 1144 is configured to be coupled to the throttle of the UAV and is further configured to sense the position of the throttle or, in other words, how much throttle the user is applying to the engine during flight. Barometric pressure sensor 1146 may be any system and/or device capable of sensing the barometric pressure in the environment surrounding in-flight module 114 and/or the UAV. VROC sensor 1148 may be any system and/or device capable to sensing the vertical rate at which the UAV is climbing (or descending).

Figure 5:
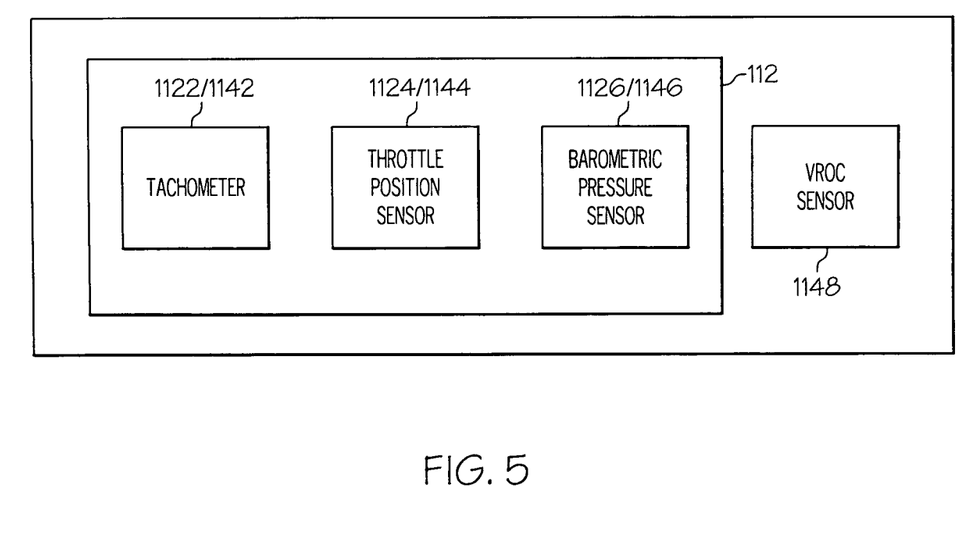
FIG. 5 is a block diagram of one embodiment of a pre-flight module and an in-flight module included in the prognostics module of FIG. 2.

In various embodiments, pre-flight module 112 and in-flight module 114 share at least one common sensor. In the embodiment illustrated in FIG. 5, pre-flight module 112 and in-flight module 114 both comprise tachometer 1122 (or tachometer 1142), throttle position sensor 1124 (or throttle position sensor 1144), and/or barometric pressure sensor 1126 (or barometric pressure sensor 1146). In-flight module 114 further comprises VROC sensor 1148 as discussed above with reference to FIG. 4.

Figure 6:
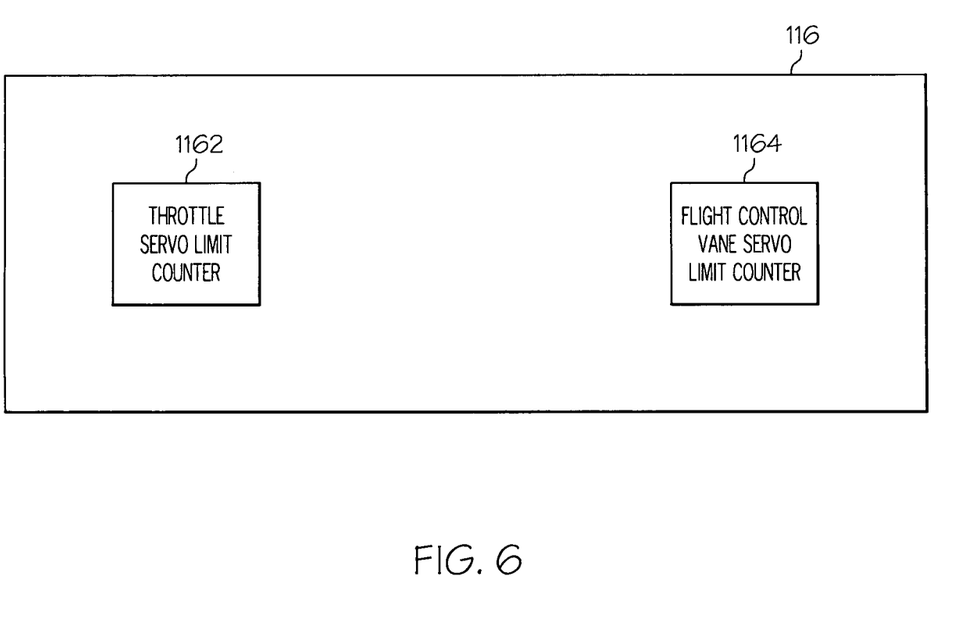
FIG. 6 is a block diagram of an embodiment of a limits module included in the prognostics module of FIG. 2.

Limits module 116, at least in the embodiment illustrated in FIG. 6, comprises a throttle servo limit counter 1162 and a flight control vane servo limit counter 1164. Throttle servo limit counter 1162 is configured to be coupled to the throttle of a UAV and is further configured to count the number of times the user (or flight controller) attempts to apply the maximum amount of throttle. In common terms, throttle servo limit counter 1162 keeps track of the number of times that the user (or flight controller) attempts to "put the pedal to the metal."

Flight control vane servo limit counter 1164 is configured to be coupled to the flight control vanes (e.g., the front flight control vane, the back flight control vane, the left flight control vane, and the right flight control vane) on the UAV. Flight control vane servo limit counter 1164 is further configured to count the number of times the user (or flight controller) attempts to apply the maximum amount of deflection on each flight control vane. That is, flight control vane servo limit counter 1164 is configured to count the number of times the user (or flight controller) attempts to apply the maximum amount of roll to the front and back flight control vanes and to apply the maximum amount of pitch to the left and right flight control vanes.

With reference again to FIG. 1, power output sensor 120 is configured to be coupled to the engine of the UAV. Power output sensor 120 is further configured to sense the amount of power being output by the engine during pre-flight operations and/or during in-flight operations.

Memory 130 may be any system, device, hardware, software, and combinations thereof capable of storing data. In one embodiment, memory 130 is configured to store one or more look-up tables 135.

In one embodiment, look-up table 135 is a table including data related to the ideal or expected amount of power the engine of the UAV should be producing for a given set of inputs during pre-flight and/or in-flight operations. For pre-flight operations, the data included in look-up table 135 relates to the ideal or expected amount of power the engine should be producing based on a rotational speed (in RPM) input for the engine, a throttle position input, and a barometric pressure input. For in-flight operations, the data included in look-up table 135 relates to the ideal or expected amount of power the engine should be producing based on a rotational speed input for the engine, a throttle position input, a barometric pressure input, and a vertical rate of climb input.

Look-up table 135, in another embodiment, further comprises data related to the number of times the user (or flight controller) attempts to apply the maximum amount of throttle and/or attempts to apply the maximum amount of deflection to one or more flight control vanes in relation to the in-flight operation inputs. That is, when the actual power output of the engine during flight is questionable as to the ability of the engine to keep the UAV aloft, the number of times the user (or flight controller) attempts to apply the maximum amount of throttle and/or the maximum amount of deflection for one or more flight control vanes may be further indicative of the airworthiness of the UAV.

Processor 140 may be any system, device, hardware, software, and combinations thereof capable of determining the airworthiness of a UAV during pre-flight operations and/or during in-flight operations. For pre-flight operations, processor 140 is configured to receive sensor data (e.g., rotational speed data, throttle position data, and/or barometric pressure data) from prognostics module 110 and use look-up table 135 to determine the amount of power the engine of the UAV should be producing (i.e., the ideal power or expected power) for pre-flight operations based on the conditions sensed by tachometer 1122 (or tachometer 1142), throttle position sensor 1124 (or throttle position sensor 1144), and/or barometric pressure sensor 1126 (or barometric pressure sensor 1146). Processor 140 is further configured to receive the actual amount of power the engine is producing from power output sensor 120 and compare the actual amount of power to the expected amount of power for pre-flight operations.

Processor 140 is also configured to determine a "no go" or "go" status based on the comparison of the actual power to the pre-flight expected power. That is, if the actual power is less than a pre-determined threshold of the pre-flight expected power, the UAV is deemed unworthy for flight. Alternatively, if the actual power is greater than the pre-determined threshold of the flight-flight expected power, the UAV is deemed worthy for flight.

For in-flight operations, processor 140 is configured to receive sensor data (e.g., rotational speed data, throttle position data, barometric pressure data, and/or VROC data) from prognostics module 110 and use look-up table 135 to determine the amount of power the engine of the UAV should be producing (i.e., the ideal power or expected power) for in-flight operations based on the conditions sensed by tachometer 1142 (or tachometer 1122), throttle position sensor 1144 (or throttle position sensor 1124), barometric pressure sensor 1146 (or barometric pressure sensor 1126), and VROC sensor 1148. Processor 140 is further configured to receive the actual amount of power the engine is producing from power output sensor 120 and compare the actual amount of power to the expected amount of power for in-flight operations.

Processor 140 is also configured to determine a "land" or "continue" status based on the comparison of the actual power to the in-flight expected power. That is, if the actual power is less than a pre-determined threshold of the expected power for flight, the UAV is deemed unworthy to continue flying. Alternatively, if the actual power is greater than the pre-determined threshold of the expected power for flight, the UAV is deemed worthy to continue flying.

In addition, processor 140 is configured to determine the airworthiness of the UAV during in-flight operations when the actual power is close to the pre-determined threshold of the expected power for flight. Specifically, processor 140 is configured to receive sensor data (e.g., counter data from throttle servo limit counter 1162 and/or flight control vane servo limit counter 1164) and use look-up table 135 to determine if the user (or flight controller) has exceeded a pre-determined threshold number of times of attempting to apply the maximum amount of throttle and/or maximum amount of deflection for one or more flight control vanes for the given conditions sensed by in-flight module 114. That is, if the number of maximum throttle and/or maximum deflection counts is greater than a pre-determined threshold number of counts for a particular set of in-flight conditions, the UAV is deemed unworthy to continue flying. Alternatively, if the number of maximum throttle and/or maximum deflection counts is less than the pre-determined threshold number of counts for the particular set of in-flight conditions, the UAV is deemed worthy to continue flying.

Figure 7:
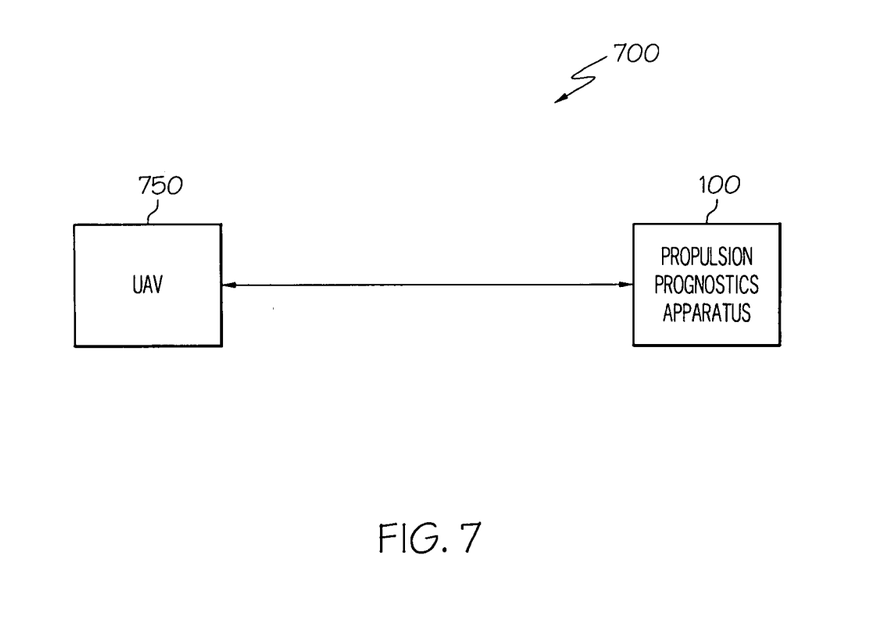
FIG. 7 is a block diagram of one embodiment of a system including an unmanned aerial vehicle comprising the propulsion prognostics apparatus of FIG. 1.

FIG. 7 is a block diagram of one embodiment of a system 700 comprising a UAV 750 including propulsion prognostics apparatus 100. UAV 750 may be any UAV known in the art or developed in the future. As such, UAV 750 comprises an engine system, a throttle, and directional flight control vanes, each of which is not specifically shown in FIG. 7, but is inferred. In one embodiment, UAV 750 is a ducted fan UAV manufactured by Honeywell International, Inc., although UAVs manufactured by other entities are also contemplated by this embodiment. In another embodiment, UAV 750 is a ducted fan vertical take-off and landing (VTOL) UAV manufactured by Honeywell International, Inc., although VTOL UAVs manufactured by other entities are also contemplated by this embodiment.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A propulsion prognostics apparatus for an unmanned aerial vehicle (UAV) having an engine system, comprising:
   a prognostics module configured to generate prognostics data;
   a power output sensor configured to be coupled to the engine system and configured to generate power output data representing an actual power output of the engine system; and
   a processor coupled to the prognostics module and the power output sensor, the processor configured to:
      receive the prognostics data and the power output data,
      compare the prognostics data and the power output data, and
      determine the airworthiness of the UAV based on the comparison.

2. The propulsion prognostics apparatus of claim 1, wherein the prognostics module comprises:
   a tachometer configured to be coupled to the engine system;
   a throttle position sensor configured to be coupled to the engine system; and
   a barometric pressure sensor.

3. The propulsion prognostics apparatus of claim 2, further comprising memory coupled to the processor, the memory comprising a look-up table storing a plurality of expected power outputs for the engine system, each expected power output represents an amount of power the engine system should be producing for a particular set of a given rotational speed of the engine system, a given throttle command, and a given barometric pressure condition.

4. The propulsion prognostics apparatus of claim 3, wherein the processor is further configured to:
   determine an expected power output of the plurality of expected power outputs based on a rotational speed of the engine system detected by the tachometer, a throttle position detected by the throttle position sensor, and a barometric pressure detected by the barometric pressure sensor; and
   compare the expected power output with the actual power output in determining the airworthiness of the UAV.

5. The propulsion prognostics apparatus of claim 1, wherein the prognostics module comprises:
   a tachometer configured to be coupled to the engine system;
   a throttle position sensor configured to be coupled to the engine system;
   a barometric pressure sensor; and
   a vertical rate of climb sensor.

6. The propulsion prognostics apparatus of claim 5, further comprising memory coupled to the processor, the memory comprising a look-up table storing a plurality of expected power outputs for the engine system, each expected power output represents an amount of power the engine system should be producing for a particular set of a given rotational speed of the engine system, a given throttle command, a given barometric pressure condition, and a given vertical rate of climb.

7. The propulsion prognostics apparatus of claim 6, wherein the processor is further configured to:
   determine an expected power output of the plurality of expected power outputs based on a rotational speed of the engine system detected by the tachometer, a throttle position detected by the throttle position sensor, a barometric pressure detected by the barometric pressure sensor, and a vertical rate of climb detected by the vertical rate of climb sensor; and
   compare the expected power output with the actual power output in determining the airworthiness of the UAV.

8. The propulsion prognostics apparatus of claim 1, wherein the prognostics module comprises a pre-flight module and an in-flight module.

9. The propulsion prognostics apparatus of claim 8, wherein the pre-flight module comprises:
   a tachometer configured to be coupled to the engine system, a throttle position sensor configured to be coupled to the engine system, and
a barometric pressure sensor; and
wherein the in-flight module comprises:
the tachometer,
the throttle position sensor,
the barometric pressure sensor, and
a vertical rate of climb sensor.

10. The propulsion prognostics apparatus of claim 9, further comprising memory coupled to the processor, the memory comprising:
a first look-up table storing a plurality of first expected power outputs for the engine system, each first expected power output represents an amount of pre-flight power the engine system should be producing for a particular set of a given rotational speed of the engine system, a given throttle command, and a given barometric pressure condition; and
a second look-up table storing a plurality of second expected power outputs for the engine system, each second expected power output represents an amount of in-flight power the engine system should be producing for a particular set of a given rotational speed of the engine system, a given throttle command, a given barometric pressure condition, and a given vertical rate of climb.

11. The propulsion prognostics apparatus of claim 10, wherein the processor is further configured to:
determine a first expected power output of the plurality of expected power outputs based on a first rotational speed of the engine system detected by the tachometer, a first throttle position detected by the throttle position sensor, and a first barometric pressure detected by the barometric pressure sensor;
compare the first expected power output with a first actual power output in determining the airworthiness of the UAV prior to flight;
determine a second expected power output of the plurality of expected power outputs based on a second rotational speed of the engine system detected by the tachometer, a second throttle position detected by the throttle position sensor, a second barometric pressure detected by the barometric pressure sensor, and a vertical rate of climb detected by the vertical rate of climb sensor; and
compare the second expected power output with a second actual power output during flight in determining the airworthiness of the UAV during flight.

12. A system, comprising:
an unmanned aerial vehicle (UAV) including an engine system; and
a propulsion prognostics apparatus coupled to the UAV, the propulsion prognostics apparatus comprising:
a prognostics module configured to generate prognostics data,
a power output sensor coupled to the engine system and configured to generate power output data representing an actual power output of the engine system, and
a processor coupled to the prognostics module and the power output sensor, the processor configured to:
receive the prognostics data and the power output data,
compare the prognostics data and the power output data, and
determine the airworthiness of the UAV based on the comparison.

13. The system of claim 12, wherein the prognostics module comprises a pre-flight module and an in-flight module.

14. The system of claim 13, wherein the pre-flight module comprises:
a tachometer configured to be coupled to the engine system,
a throttle position sensor configured to be coupled to the engine system, and
a barometric pressure sensor; and
wherein the in-flight module comprises:
the tachometer,
the throttle position sensor,
the barometric pressure sensor, and
a vertical rate of climb sensor.

15. The system of claim 14, further comprising memory coupled to the processor, the memory comprising:
a first look-up table storing a plurality of first expected power outputs for the engine system, each first expected power output represents an amount of pre-flight power the engine system should be producing for a particular set of a given rotational speed of the engine system, a given throttle command, and a given barometric pressure condition; and
a second look-up table storing a plurality of second expected power outputs for the engine system, each second expected power output represents an amount of in-flight power the engine system should be producing for a particular set of a given rotational speed of the engine system, a given throttle command, a given barometric pressure condition, and a given vertical rate of climb.

16. The system of claim 15, wherein the processor is further configured to:
determine a first expected power output of the plurality of expected power outputs based on a first rotational speed of the engine system detected by the tachometer, a first throttle position detected by the throttle position sensor, and a first barometric pressure detected by the barometric pressure sensor;
compare the first expected power output with a first actual power output in determining the airworthiness of the UAV prior to flight;
determine a second expected power output of the plurality of expected power outputs based on a second rotational speed of the engine system detected by the tachometer, a second throttle position detected by the throttle position sensor, a second barometric pressure detected by the barometric pressure sensor, and a vertical rate of climb detected by the vertical rate of climb sensor; and
compare the second expected power output with a second actual power output during flight in determining the airworthiness of the UAV during flight.

17. The system of claim 13, wherein the pre-flight module comprises:
a tachometer coupled to the engine system;
a throttle position sensor coupled to the engine system; and
a barometric pressure sensor.

18. The system of claim 17, further comprising memory coupled to the processor, the memory comprising a look-up table storing a plurality of expected power outputs for the engine system, each expected power output represents an amount of power the engine system should be producing for a particular set of a given rotational speed of the engine system, a given throttle command, and a given barometric pressure condition, wherein the processor is further configured to:
determine an expected power output of the plurality of expected power outputs based on a rotational speed of the engine system detected by the tachometer, a throttle position detected by the throttle position sensor, and a barometric pressure detected by the barometric pressure sensor, and compare the expected power output with the actual power output in determining the airworthiness of the UAV prior to flight.

19. The system of claim 13, wherein the in-flight module comprises:
   a tachometer coupled to the engine system;
   a throttle position sensor coupled to the engine system;
   a barometric pressure sensor; and
   a vertical rate of climb sensor.

20. The system of claim 19, further comprising memory coupled to the processor, the memory comprising a look-up table storing a plurality of expected power outputs for the engine system, each expected power output represents an amount of power the engine system should be producing for a particular set of a given rotational speed of the engine system, a given throttle command, a given barometric pressure condition, and a given vertical rate of climb, wherein the processor is further configured to:
   determine an expected power output of the plurality of expected power outputs based on a rotational speed of the engine system detected by the tachometer, a throttle position detected by the throttle position sensor, a barometric pressure detected by the barometric pressure sensor, and a vertical rate of climb detected by the vertical rate of climb sensor, and
   compare the expected power output with the actual power output in determining the airworthiness of the UAV during flight.

* * * * *